US012110352B2

(12) United States Patent
Carella et al.

(10) Patent No.: US 12,110,352 B2
(45) Date of Patent: Oct. 8, 2024

(54) VINYLIDENE FLUORIDE POLYMER DISPERSION

(71) Applicant: SOLVAY SPECIALTY POLYMERS ITALY S.P.A., Bollate (IT)

(72) Inventors: Serena Carella, Parabiago (IT); Mirko Mazzola, Milan (IT); Marco Avataneo, Milan (IT); Andrea Vittorio Oriani, Milan (IT); Emanuele Di Nicolo', Gorla Minore (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 719 days.

(21) Appl. No.: 17/311,034

(22) PCT Filed: Dec. 2, 2019

(86) PCT No.: PCT/EP2019/083359
§ 371 (c)(1),
(2) Date: Jun. 4, 2021

(87) PCT Pub. No.: WO2020/126448
PCT Pub. Date: Jun. 25, 2020

(65) Prior Publication Data
US 2022/0025088 A1    Jan. 27, 2022

(30) Foreign Application Priority Data

Dec. 20, 2018 (EP) .................................. 18214308

(51) Int. Cl.
| | |
|---|---|
| *C08F 214/22* | (2006.01) |
| *C08F 2/22* | (2006.01) |
| *C08F 2/38* | (2006.01) |
| *C08F 214/18* | (2006.01) |
| *C08F 214/28* | (2006.01) |
| *C08F 220/06* | (2006.01) |
| *C08F 220/20* | (2006.01) |
| *C08F 222/20* | (2006.01) |
| *C08J 3/12* | (2006.01) |
| *C08K 3/36* | (2006.01) |
| *H01G 11/30* | (2013.01) |
| *H01M 50/403* | (2021.01) |
| *H01M 50/426* | (2021.01) |
| *H01M 50/446* | (2021.01) |
| *H01M 50/449* | (2021.01) |

(52) U.S. Cl.
CPC ............ *C08F 214/22* (2013.01); *C08F 2/22* (2013.01); *C08F 2/38* (2013.01); *C08F 214/28* (2013.01); *C08F 220/06* (2013.01); *C08F 220/20* (2013.01); *C08J 3/12* (2013.01); *C08K 3/36* (2013.01); *H01G 11/30* (2013.01); *H01M 50/403* (2021.01); *H01M 50/426* (2021.01); *H01M 50/446* (2021.01); *H01M 50/449* (2021.01); *C08F 2438/03* (2013.01); *C08F 2810/40* (2013.01)

(58) Field of Classification Search
CPC .. C08F 214/225; C08F 214/18; C08F 214/28; C08F 222/20; C09D 127/16; H01G 11/30; H01M 50/426
See application file for complete search history.

(56) References Cited

U.S. PATENT DOCUMENTS

| | | |
|---|---|---|
| 6,203,944 B1 | 3/2001 | Turner et al. |
| 10,774,233 B2 * | 9/2020 | Wille .................... C08F 285/00 |
| 2014/0154611 A1 | 6/2014 | Ameduri et al. |
| 2015/0057419 A1 | 2/2015 | Asandei |
| 2017/0081447 A1 | 3/2017 | Dossi et al. |

FOREIGN PATENT DOCUMENTS

| | | |
|---|---|---|
| EP | 791973 A2 | 8/1997 |
| WO | 0003444 A1 | 1/2000 |
| WO | 2008129041 A1 | 1/2010 |
| WO | 2019063445 A1 | 4/2019 |

OTHER PUBLICATIONS

Standard ASTM D3835—Standard Test Method for Determination of Properties of Polymeric Materials by Means of a Capillary Rheometer , 2008, pp. 1-11.
Pianca M. et al., "End groups in fluoropolymers", Journal of Fluorine Chemistry, 1999, vol. 95, pp. 71-84—Elsevier Science SA.
Boyer C. et al., "Iodine Transfer Polymerization (ITP) of Vinylidene Fluoride (VDF). Influence of the Defect of VDF Chaining on the Control of ITP", Macromolecules (2005), 38(25), 10353-10362—American Chemical Society.
Boyer C. et al., "Kinetics of the iodine transfer polymerization of vinylidene fluoride", Journal of Polymer Science, Part A: Polymer Chemistry (2006), 44(19), 5763-5777—Wiley Periodicals Inc.
Ameduri B., "Controlled radical (Co)polymerization of fluoromonomers", Macromolecules (Washington, DC, United States) (2010), 43(24), 10163-10184—American Chemical Society.
Kostov G. et al., "First Amphiphilic Poly(vinylidene fluoride-co-3,3,3-trifluoropropene)-b-oligo(vinyl alcohol) Block Copolymers as Potential Nonpersistent Fluorosurfactants from Radical Polymerization Controlled by Xanthate", Macromolecules (Washington, DC, United States) (2011), 44(7), 1841-1855—American Chemical Society.

(Continued)

*Primary Examiner* — Caixia Lu
(74) *Attorney, Agent, or Firm* — Osha Bergman Watanabe & Burton LLP

(57) ABSTRACT

The present invention pertains to an aqueous dispersion of a vinylidene fluoride polymer having a high molecular weight and possessing a substantially linear structure, leading to reduced amount of gels/insoluble fractions, to a method for its preparation and to its use for the manufacture of electrochemical cell components, such as electrodes and/or composite separators or for the manufacture of membranes.

20 Claims, 1 Drawing Sheet

(56) References Cited

OTHER PUBLICATIONS

Girard E. et al., "Direct Synthesis of Vinylidene Fluoride-Based Amphiphilic Diblock Copolymers by RAFT/MADIX Polymerization", ACS Macro Letters (2012), 1(2), 270-274—American Chemical Society.
Ameduri B., "Recent advances in the controlled radical (co) polymerization of fluoroalkenes and applications therefrom", Journal of the Taiwan Institute of Chemical Engineers (2014), 45(6), 3124-3133—Elsevier B.V.
Guerre M. et al., "Deeper Insight into the MADIX Polymerization of Vinylidene Fluoride", Macromolecules (Washington, DC, United States) (2015), 48(21), 7810-7822—American Chemical Society.
Guerre M. et al., "Limits of Vinylidene Fluoride RAFT Polymerization", Macromolecules (Washington, DC, United States) (2016), 49(15), 5386-5396—American Chemical Society.
Guerre M. et al., "A Journey into the Microstructure of PVDF Made by RAFT", Macromolecular Chemistry and Physics (2016), 217(20), 2275-2285—Wiley-VCH Verlag Gmbh & Co KGaA, Weinheim.
Banerjee S. et al., "Synthesis of ω-Iodo and Telechelic Diiodo Vinylidene Fluoride-Based (Co)polymers by Iodine Transfer Polymerization Initiated by an Innovative Persistent Radical", Macromolecules (Washington, DC, United States) (2017), 50(1), 203-214—American Chemical Society.
Brandl F. et al., "Kinetic monte carlo simulation based detailed understanding of the transfer processes in semi- batch iodine transfer emulsion polymerizations of vinylidene fluoride", Polymers (Basel, Switzerland) (2018), 10(9), 1008/1-1008/16.

* cited by examiner

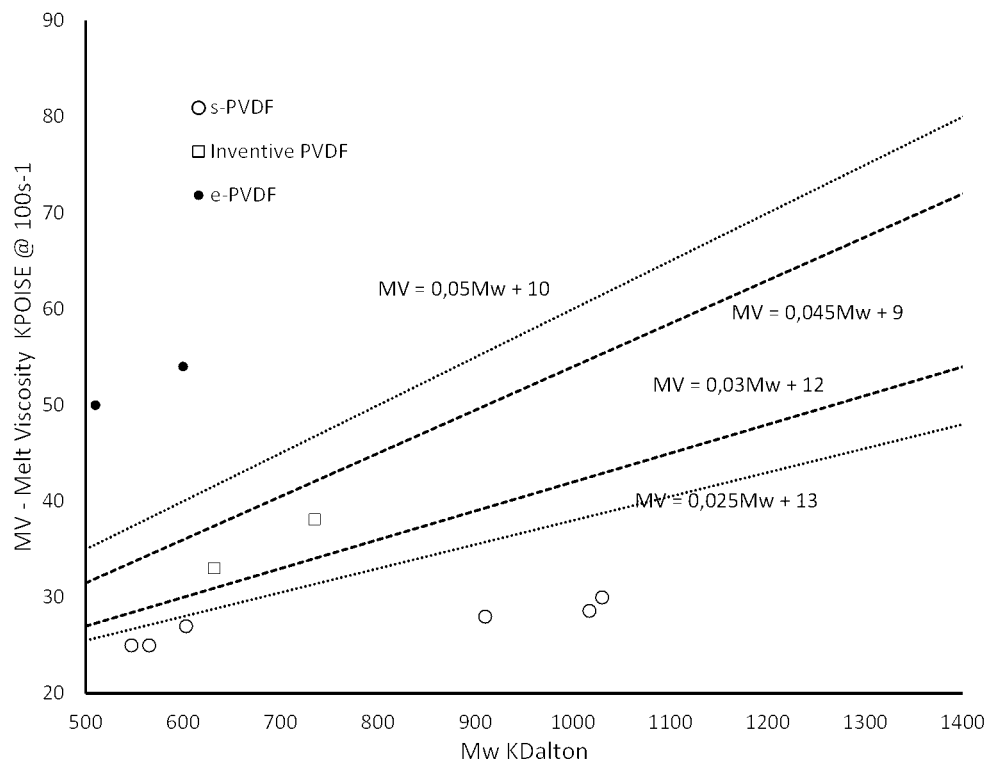

VINYLIDENE FLUORIDE POLYMER DISPERSION

CROSS-REFERENCE TO RELATED APPLICATION

This application is a U.S. national stage entry under 35 U.S.C. § 371 of International Application No. PCT/EP2019/083359 filed Dec. 2, 2019, which claims priority to European Patent application No. 18214308.1, filed on Dec. 20, 2018. The entire contents of these applications are explicitly incorporated herein by this reference.

TECHNICAL FIELD

The present invention pertains to a vinylidene fluoride polymer aqueous dispersion, to a method for its preparation and to its use for the manufacture of electrochemical cell components, such as electrodes and/or composite separators or for the manufacture of membranes, in particular porous membranes.

BACKGROUND ART

Vinylidene fluoride (VDF) polymers are known in the art to be suitable as binders for the manufacture of electrodes, in particular cathodes, for the manufacture of composite separators, and/or for coatings of porous separators for use in non-aqueous-type electrochemical devices such as batteries, preferably secondary batteries, and electric double layer capacitors. More generally, VDF polymers have found utility in a variety of other fields of use, whereas its durability, chemical inertia and other advantageous properties are highly valuable, including notably architectural coatings, membranes manufacture, coating's for chemical industry and/or O&G applications.

Leading materials which are available in the marketplace for this field of use are VDF polymers made by suspension polymerization which may be modified by incorporation of polar groups, and which are processed by dissolution in solvent systems which generally comprises N-methyl pyrrolidone or mixtures of N-methyl pyrrolidone and a diluting solvent such as acetone, propyl acetate, methyl ethyl ketone and ethyl acetate. Exemplary materials are e.g. disclosed in EP 2147029 A (SOLVAY SOLEXIS SPA) 27/01/2010 provide for linear semi-crystalline copolymers comprising recurring units derived from vinylidene fluoride (VDF) monomer and at least one hydrophilic (meth)acrylic monomer, having improved thermal stability and delivering outstanding cohesion when used as binder in batteries.

While technologies based on suspension-based VDF polymers have been pursued, the interest in emulsion-polymerized VDF polymers dispersions is increasing, driven by both economic and environmental aspects.

It is actually generally recognized that post-processing emulsion-polymerized VDF polymers generally produces fine powders having surface area than suspension polymerized VDF polymers, which confers easier dissolution, and hence faster processing, in all solvent-based processing techniques, which are often used. Further, water-borne dispersion are advantageous in all those fields where non-solvent based solutions are pursued.

Further, in the area of VDF polymers powders, it has been generally recognized that a high molecular weight is beneficial for this field of use. Notably, EP 0791973 A (KUREHA) 27/08/1997 pertains to a binder solution for providing an electrode suitable for use in non-aqueous-type electrochemical devices, such as a battery and an electric double layer capacitor, which is formed by dissolving a vinylidene fluoride polymer having an inherent viscosity (and thus a polymerization degree) higher than a conventional level in an organic solvent. An electrode-forming composition is formed by dispersing powdery electrode material in the binder solution and is applied onto an electroconductive substrate, followed by drying, to form a composite electrode layer, which retains the powdery electrode material at a smaller amount of vinylidene fluoride polymer than a conventional level and is well resistant to a non-aqueous electrolytic solution.

Nevertheless, it is generally recognized that the higher polymerization temperatures, lower pressures and other polymerization parameters of emulsion-polymerization are such to generate a higher number of inversions (head to head/tail to tail)/branches/defects with respect to the theoretical linear sequence of head to tail recurring units, and that all those phenomena are exacerbated when targeting higher molecular weights. As a consequence, high molecular weight VDF polymers from emulsion polymerization generally come with a non-negligible fraction of gels or less soluble residues, and with peculiar rheological behaviour, due to the presence of long chain branches.

To effectively employ emulsion-polymerized VDF polymers in electrode- or separator-forming processes, as well as in a variety of other fields of use, it is hence important to access materials which are endowed with high molecular weight but which are essentially deprived of gels/insoluble fractions.

In this field, hence, a continuous quest exists for aqueous dispersions of high molecular weight VDF polymers possessing all required properties for being used in the field of components for secondary batteries, but which are essentially deprived from gels/insoluble fractions.

Now, techniques for manufacturing VDF dispersions based on aqueous emulsion polymerization, generally in the presence of fluorinated emulsifiers, are known. Further, the use of xanthate-type chain transfer agents in the polymerization of VDF has been already described in general terms in the art. In this area, US 2014154611 (ENSCM) 5/06/2014 relates to a method of preparing a vinylidene fluoride copolymer in 1,1,1,3,3-pentafluorobutane, i.e. in solution, comprising a step of copolymerization of VDF with an alpha-trifluoromethacrylic acid monomer or derivative of alpha-trifluoromethacrylic acid, in the presence of a xanthate or trithiocarbonate compound. According to paragraph [0054], the molecular weight of the copolymer obtained is preferably from 800 to 400 000 g/mol, more preferably from 1500 to 100 000 g/mol.

Further, US 2017081447 (SOLVAY SPECIALTY POLYMERS ITALY SPA) 23/03/2017 is directed to aqueous emulsion polymerization of fluoromonomers (including notably vinylidene fluoride) in the presence of a RAFT/MADIX agent. Molecular weight data exemplified in connection with emulsion polymerization of mixtures of VDF/TFE/HFP carried out at high molar ratios xanthate/radical initiator, leading to elastomeric copolymers, indicate that molecular weights exceeding 500,000 could be obtained solely by addition of a bifunctional branching comonomer.

SUMMARY OF INVENTION

The Applicant has now found that a solution to the above defined problem is provided by an aqueous dispersion [dispersion (D)] comprising particles of a vinylidene fluoride (VDF) polymer [polymer (A)] comprising recurring units derived from vinylidene fluoride (VDF) monomer, said polymer (A)

(i) comprising more than 85.0% moles of recurring units derived from VDF, with respect to the total number of recurring units of polymer (A);

(ii) comprising sulphur-containing chain ends;

(iii) possessing a weight averaged molecular weight ($M_w$) of at least 500 KDalton, when measured by GPC, using N,N-dimethylacetamide (DMA) as solvent, against monodisperse polystyrene standards;

wherein the relation between melt viscosity (MV) in KPoise determined at a shear rate of 100 sec$^{-1}$, and at a temperature of 230° C., according to ASTM D3835, and $M_w$, expressed in KDalton, satisfies the following inequality:

$0.025 \times M_w(KDalton)+13 \leq MV(KPoise) \leq 0.050 \times M_w(KDalton)+10$.

The invention further pertains to a method of making the said dispersion (D), said method comprising emulsion polymerization of VDF in an aqueous medium in the presence of an inorganic initiator and in the presence of a RAFT/MADIX agent of any general formulae (I) and (II):

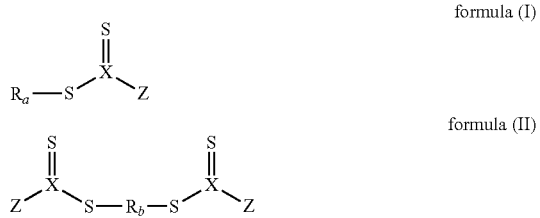

formula (I)

formula (II)

wherein X is carbon or phosphorous, preferably carbon; $R_a$ is a monovalent organic group optionally substituted with one or more hydrophilic groups, $R_b$ is a divalent organic group optionally substituted with one or more hydrophilic groups, and Z is any group that can promote sufficient reactivity of the thiocarbonyl group towards radical addition, wherein the molar ratio between the said RAFT/MADIX agent and the said initiator is of less than 0.050 mol/mol.

Still another object of the invention is a powder comprising particles of a vinylidene fluoride (VDF) polymer [polymer (A)] comprising recurring units derived from vinylidene fluoride (VDF) monomer, said polymer (A)

(i) comprising more than 85.0% moles of recurring units derived from VDF, with respect to the total number of recurring units of polymer (A);

(ii) comprising sulphur-containing chain ends;

(iii) possessing a weight averaged molecular weight ($M_w$) of at least 500 KDalton, when measured by GPC, using N,N-dimethylacetamide (DMA) as solvent, against monodisperse polystyrene standards;

wherein the relation between melt viscosity (MV) in KPoise determined at a shear rate of 100 sec$^{-1}$, and at a temperature of 230° C., according to ASTM D3835, and $M_w$, expressed in KDalton, satisfies the following inequality:

$0.025 \times M_w(KDalton)+13 \leq MV(KPoise) \leq 0.050 \times M_w(KDalton)+10$.

wherein said particles of polymer (A) possess a primary particle average size of less than 1 µm.

The Applicant has surprisingly found that this manufacturing method enables producing a dispersion of VDF polymers which, while achieving high molecular weight of contained VDF polymer, so as to provide for outstanding behaviour in electrochemical cell components' field of use, yet possesses a quasi-linear structure, as expressed by above mentioned particular relation between MV and $M_w$, so that the insoluble fraction/gels due to long branches/cross-linked polymer chains is substantially decreased.

Further, the method of the invention provides for VDF polymers which are particularly suited for being processed from solution, thanks to their total solubility behaviour, giving rise to solutions which, because of the substantially linear microstructure, have moderate liquid viscosity even at high molecular weight. Such VDF polymers are also useful for the manufacture of membranes, in particular porous membranes.

BRIEF DESCRIPTION OF DRAWINGS

FIG. 1 is a graph depicting the relation between melt viscosity (MV) in KPoise and weight averaged molecular weight ($M_w$) in KDalton, as measured for VDF polymers of the invention (□), for reference emulsion-polymerized VDF-polymers (•), and for reference suspension-polymerized polymers (○).

DESCRIPTION OF EMBODIMENTS

Polymer (A) comprises recurring units derived from derived from vinylidene fluoride (VDF).

The polymer (A) may further comprise recurring units derived from at least one other comonomer (C) different from VDF.

The comonomer (C) can be either a hydrogenated comonomer [comonomer (H)] or a fluorinated comonomer [comonomer (F)].

By the term "hydrogenated comonomer [comonomer (H)]", it is hereby intended to denote an ethylenically unsaturated comonomer free of fluorine atoms.

Non-limitative examples of suitable hydrogenated comonomers (H) include, notably, ethylene, propylene, vinyl monomers such as vinyl acetate, as well as styrene monomers, like styrene and p-methylstyrene.

Monomer (H) may be a monomer comprising at least one polar group selected from the group consisting of hydroxyl groups, carboxylic acid groups, epoxy groups.

According to certain preferred embodiments, polymer (A) further comprises recurring units derived from at least one monomer (H) which is selected from hydrophilic (meth) acrylic monomers (MA) of formula:

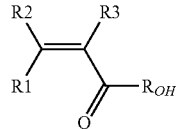

wherein each of R1, R2, R3, equal or different from each other, is independently an hydrogen atom or a $C_1$-$C_3$ hydrocarbon group, and $R_{OH}$ is a hydroxyl group or a $C_1$-$C_5$ hydrocarbon moiety comprising at least one hydroxyl group.

By the term "fluorinated comonomer [comonomer (F)]", it is hereby intended to denote an ethylenically unsaturated comonomer comprising at least one fluorine atom.

The comonomer (C) is preferably a fluorinated comonomer [comonomer (F)].

Non-limitative examples of suitable fluorinated comonomers (F) include, notably, the followings:

(a) $C_2$-$C_8$ fluoro- and/or perfluoroolefins such as tetrafluoroethylene (TFE), hexafluoropropylene (HFP), pentafluoropropylene and hexafluoroisobutylene;

(b) $C_2$-$C_8$ hydrogenated monofluoroolefins such as vinyl fluoride, 1,2-difluoroethylene and trifluoroethylene;

(c) perfluoroalkylethylenes of formula $CH_2=CH-R_{f0}$, wherein $R_{f0}$ is a $_1$-$C_6$ perfluoroalkyl group;

(d) chloro- and/or bromo- and/or iodo-$C_2$-$C_6$ fluoroolefins such as chlorotrifluoroethylene (CTFE);

(e) (per)fluoroalkylvinylethers of formula $CF_2=CFOR_{f1}$, wherein $R_{f1}$ is a $C_1$-$C_6$ fluoro- or perfluoroalkyl group, e.g. $-CF_3$, $-C_2F_5$, $-C_3F_7$;

(f) (per)fluoro-oxyalkylvinylethers of formula $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(g) fluoroalkyl-methoxy-vinylethers of formula $CF_2=CFOCF_2OR_{f2}$, wherein $R_{f2}$ is a $C_1$-$C_6$ fluoro- or perfluoroalkyl group, e.g. $-CF_3$, $-C_2F_5$, $-C_3F_7$ or a $C_1$-$C_6$ (per)fluorooxyalkyl group having one or more ether groups, e.g. $-C_2F_5-O-CF_3$;

(h) fluorodioxoles of formula:

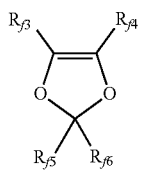

wherein each of $R_{f3}$, $R_{f4}$, $R_{f5}$ and $R_{f6}$, equal to or different from each other, is independently a fluorine atom, a $C_1$-$C_6$ fluoro- or per(halo)fluoroalkyl group, optionally comprising one or more oxygen atoms, e.g. $-CF_3$, $-C_2F_5$, $-C_3F_7$, $-OCF_3$, $-OCF_2CF_2OCF_3$.

Most preferred fluorinated comonomers (F) are tetrafluoroethylene (TFE), trifluoroethylene (TrFE), chlorotrifluoroethylene (CTFE), hexafluoropropylene (HFP), perfluoromethyl vinyl ether (PMVE), perfluoropropyl vinyl ether (PPVE) and vinyl fluoride, and among these, HFP is most preferred.

Should at least one comonomer (C) (preferably HFP) be present, the polymer (A) comprises typically from 0.05% to 14.5% by moles, preferably from 1.0% to 13.0% by moles, of recurring units derived from said comonomer(s) (C), with respect to the total moles of recurring units of polymer (A).

However, it is necessary that the amount of recurring units derived from vinylidene fluoride in the polymer (A) is at least 85.0 mol %, preferably at least 86.0 mol %, more preferably at least 87.0 mol %, so as not to impair the excellent properties of vinylidene fluoride resin, such as chemical resistance, weatherability, and heat resistance. For instance, when polymer (A) comprises an amount of VDF units of less than 85.0 mol %, it cannot be used for formulating coating compositions for making composite separators for batteries, as the corresponding polymer would dissolve in the liquid solvent used as electrolyte liquid phase.

The term "at least one hydrophilic (meth)acrylic monomer (MA)" is understood to mean that the polymer (A) may comprise recurring units derived from one or more than one hydrophilic (meth)acrylic monomer (MA) as above described. In the rest of the text, the expressions "hydrophilic (meth)acrylic monomer (MA)" and "monomer (MA)" are understood, for the purposes of the present invention, both in the plural and the singular, that is to say that they denote both one or more than one hydrophilic (meth)acrylic monomer (MA).

According to certain embodiments, polymer (A) consists essentially of recurring units derived from VDF, and from monomer (MA).

According to other embodiments, polymer (A) consists essentially of recurring units derived from VDF, from HFP and from monomer (MA).

The expression "consists essentially" when used in connection with recurring units of polymer (A) is understood to mean that defects, end chains and impurities may be present in polymer (A) in addition to the listed recurring units, without this substantially affecting the advantageous features of polymer (A).

Polymer (A) may still comprise other moieties such as defects, end-groups and the like, which do not affect nor impair its physico-chemical properties, provided the above recited inequality between weight averaged molecular weight and melt viscosity is satisfied.

The hydrophilic (meth)acrylic monomer (MA) preferably complies formula:

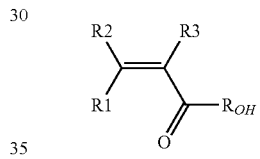

wherein each of R1, R2, $R_{OH}$ have the meanings as above defined, and R3 is hydrogen; more preferably, each of R1, R2, R3 are hydrogen, while $R_{OH}$ has the same meaning as above detailed.

Non limitative examples of hydrophilic (meth)acrylic monomers (MA) are notably acrylic acid, methacrylic acid, hydroxyethyl (meth)acrylate, hydroxypropyl(meth)acrylate; hydroxyethylhexyl(meth)acrylates.

The monomer (MA) is more preferably selected among:

hydroxyethylacrylate (HEA) of formula:

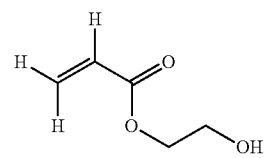

2-hydroxypropyl acrylate (HPA) of either of formulae:

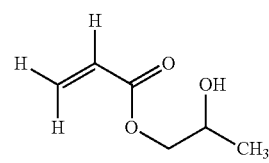

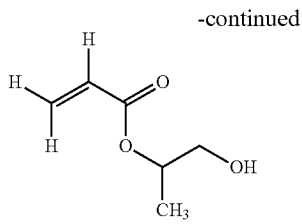

acrylic acid (AA) of formula:

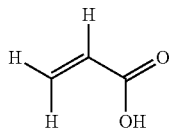

and mixtures thereof.

More preferably, the monomer (MA) is AA and/or HEA, even more preferably is AA.

Determination of the amount of (MA) monomer recurring units in polymer (A) can be performed by any suitable method. Mention can be notably made of acid-base titration methods, well suited e.g. for the determination of the acrylic acid content, of NMR methods, adequate for the quantification of (MA) monomers comprising aliphatic hydrogens in side chains (e.g. HPA, HEA), of weight balance based on total fed (MA) monomer and unreacted residual (MA) monomer during polymer (A) manufacture.

Polymer (A) comprises preferably at least 0.1, more preferably at least 0.2% moles of recurring units derived from said hydrophilic (meth)acrylic monomer (MA) and/or polymer (A) comprises preferably at most 10, more preferably at most 7.5% moles, even more preferably at most 5% moles, most preferably at most 3% moles of recurring units derived from said hydrophilic (meth)acrylic monomer (MA).

Polymer (A) possesses a weight averaged molecular weight ($M_w$) of at least 500 KDalton, when measured by GPC, using dimethylacetamide (DMA) as solvent, against monodisperse polystyrene standards. Upper boundaries for $M_w$ are not particularly critical; it remains nevertheless understood that polymer (A) will generally have a $M_w$ of at most 1500 KDalton, preferably at most 1400 KDalton, even more preferably of at most 1300 KDalton.

Particularly preferred are polymers (A) whereas the $M_w$ is of at least 550 KDalton, even more preferably at least 600 KDalton and/or of at most 1250 KDalton, even more preferably at least 1200 KDalton.

As said, polymer (A) is characterized by a relation between melt viscosity (MV) in KPoise determined at a shear rate of 100 sec$^{-1}$, and at a temperature of 230° C., according to ASTM D3835, and $M_w$, expressed in KDalton, which satisfies the following inequality: $0.025 \times M_w$ (KDalton)+13 MV (KPoise)$\leq 0.050 \times M_w$ (KDalton)+10.

The Applicant think, without being bound by this theory, that at a given value of $M_w$, polymer (A) of the aqueous dispersion of the present invention is characterized by a lower melt viscosity than traditional emulsion polymerized VDF polymers, which viscosity is strongly affected by entanglements between short and long chain branches, and hence approaches the melt viscosity of suspension-polymerized VDF polymers, known for their more linear and regular structure.

Preferably, MV is such to satisfy the inequality MV (KPoise)>$0.030 \times M_w$ (KDalton)+12 and/or MV (KPoise) $\leq 0.045 \times M_w$ (KDalton)+9.

Most preferably, MV is such to satisfy the inequality: $0.030 \times M_w$ (KDalton)+12 MV (KPoise)$\leq 0.045 \times M_w$ (KDalton)+9.

As per the melt viscosity per se, it is generally understood that the polymer (A) possesses a melt viscosity of generally at least 23.5, preferably at least 27.0, more preferably at least 28.0 KPoise, and/or generally of at most 58.0, preferably at most 57.0 KPoise, when measured in conditions set forth above.

According to certain particular embodiments, polymer (A) possesses a MV of at least 35.0, preferably at least 36.0 KPoise and/or of at most 52.0, preferably of at most 50.0 KPoise, which MV will be adequate for ensuring optimal properties in electrochemicals' applications.

Generally, particles of polymer (A) possess a primary particle average size of less than 1 μm. For the purpose of the present invention, the term "primary particles" is intended to denote primary particles of polymer (A) deriving directly from aqueous emulsion polymerization, without isolation of the polymer from the emulsion (i.e. the latex). Primary particles of polymer (A) are thus to be intended distinguishable from agglomerates (i.e. collection of primary particles), which might be obtained by recovery and conditioning steps of such polymer manufacture such as concentration and/or coagulation of aqueous latexes of the polymer (A) and subsequent drying and homogenization to yield the respective powder.

The dispersion (D) of the invention is thus distinguishable from aqueous slurry that can be prepared by dispersing powders a polymer in an aqueous medium. The average particle size of powders of a polymer or copolymer dispersed in aqueous slurry is typically higher than 1 μm, as measured according to ISO 13321.

Preferably, the primary particles average size of the particles of polymer (A) in dispersion (D) is above 20 nm, more preferably above 30 nm, even more preferably above 50 nm, and/or is below to 600 nm, more preferably below 400 and even more preferably below 350 nm as measured according to ISO 13321.

As said, polymer (A) is required to comprise sulphur-containing end-groups. Generally, polymer (A) is understood to comprise groups of formula ($I_x$):

formula ($I_x$)

wherein X, equal to or different from each other at each occurrence, is phosphorous or carbon, preferably carbon, and Z, equal to or different from each other at each occurrence, is a monovalent group, possibly comprising one or more than one heteroatoms, and possibly comprising one or more than one carbon atoms.

In formula ($I_x$) above Z may be selected among —OH, —SH, optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy-phosphinyl [—P(=O)(OR$^4$)$_2$], dialkyl- or diaryl-phosphinyl [—P(=O) R$^4_2$], where R$^4$ is selected from the group consisting of optionally substituted $C_1$-$C_{18}$ alkyl, optionally substituted $C_2$-$C_{18}$ alkenyl, optionally substituted aryl, optionally substituted heterocyclyl, optionally substituted arylalkyl, optionally substituted alkaryl, optionally substituted acylamino, optionally substituted acylimino, optionally substituted amino, a polymer chain formed by any mechanism, for example polyalkylene oxide polymers such as water soluble polyethylene glycol or polypropylene glycol, and alkyl end capped derivatives thereof. Optional substituents for $R^4$ and Z groups include epoxy, hydroxy, alkoxy, acyl, acyloxy, carboxy (and its salts), sulfonic acid (and its salts), alkoxy- or aryloxy-carbonyl, isocyanato, cyano, silyl, halo, and dialkylamino.

Preferably, Z is selected among —OH, —SH, optionally substituted alkoxy, optionally substituted aryloxy, optionally substituted alkylthio, optionally substituted arylalkylthio, dialkoxy- or diaryloxy-phosphinyl [—P(=O)$(OR^4)_2$], dialkyl- or diaryl-phosphinyl [—P(=O)$R^4_2$], where $R^4$ is as defined above.

More preferably Z is selected, without limitation, from the group consisting of: —OH, —SH, —$OR^5$, —$SR^5$, where $R^5$ is an optionally substituted $C_1$-$C_{20}$ alkyl, —$NR^6_2$ wherein each of $R^6$, equal to or different from each other, is selected from optionally substituted $C_1$-$C_{20}$ and alkyl optionally substituted aryl, and

wherein e is an integer from 2 to 4.

Most preferably, Z is selected, without limitation, from the group consisting of —OH, —SH, —$SCH_2(C_6H_5)$, —$S(CH_2)_uCO_2H$ wherein u is an integer from 2 to 11, —$SC_zH_{2z+1}$, —$OC_zH_{2z+1}$, wherein z is an integer from 1 to 12, preferably from 2 to 12, such as 2, 3, 4, 6, 8, 10, 12, —$SCH_2CH_2OH$, —$OCH_2CF_3$, —$OCH_2CH_3$, —$N(C_6H_5)(CH_3)$.

As used herein, the terms "aryl" and "heteroaryl" refer to any substituent which includes or consists of one or more aromatic or heteroaromatic ring respectively, and which is attached via a ring atom. The rings may be mono or polycyclic ring systems, although mono or bicyclic 5 or 6 membered rings are preferred. The term "alkyl", used either alone or in combination, as in "alkenyloxyalkyl", "alkylthio", "alkylamino" and "dialkylamino" denotes straight chain, branched or cyclic alkyl, preferably $C_1$-$C_{20}$ alkyl or cycloalkyl. The term "alkoxy" denotes straight chain or branched alkoxy, preferably $C_{10}C_{20}$ alkoxy. Examples of alkoxy include methoxy, ethoxy, n-propoxy, isopropoxy and the different butoxy isomers. The term "alkenyl" denotes groups formed from straight chain, branched or cyclic alkenes including ethylenically mono-, di- or poly-unsaturated alkyl or cycloalkyl groups as previously defined, preferably $C_2$-$C_{20}$ alkenyl. The term "acyl" either alone or in combination, as in "acyloxy", "acylthio", "acylamino" or "diacylamino", denotes carbamoyl, aliphatic acyl group and acyl group containing an aromatic ring, which is referred to as aromatic acyl or a heterocyclic ring which is referred to as heterocyclic acyl, preferably $C_1$-$C_{20}$ acyl.

Polymer (A) has preferably sulphur-containing chain ends in an amount of at least 0.2, preferably at least 0.5 mmol/kg and/or of at most 15.0, preferably at most 12.0 mmol/kg, most preferably at most 10.0 mmol/kg.

Actually, the above mentioned amount of sulphur-containing chain ends is the inevitable fingerprint due to the use of the RAFT/MADIX agents in emulsion polymerization for the manufacture of dispersion (D). Without being bound by this theory, the Applicant believes that the presence of sulphur-containing end groups in the high molecular weight VDF polymers is representative of the use of the minimum required amount of chain agent for ensuring pseudo-living character to the polymerization chain growth, without nonetheless having chain transfer competing to chain growth, and hence finally limiting achievable molecular weight and/or imparting to the final polymer (A) chemical reactivity/instability because of the presence of said chain ends.

Concentration of chain ends may be determined by elemental analysis; structural/molecular identification of chain ends may be performed notably by $^1$H-NMR, based on the techniques detailed in PIANCA, M., et al. End groups in fluoropolymers. *Journal of Fluorine Chemistry*. 1999, vol. 95, p. 71-84, in substantially analogous manner as per the determination of other end chains, considering chemical shift of involved groups.

According to certain preferred embodiments, the dispersion (D) is substantially free from fluorinated surfactants.

The expression "substantially free" in combination with the amount of fluorinated surfactants in dispersion (D) is to be meant to exclude the presence of any significant amount of said fluorinated surfactants, e.g. requiring the fluorinated surfactants to be present in an amount of less than 5 ppm, preferably of less than 3 ppm, more preferably of less than 1 ppm, with respect to the total weight of dispersion (D).

When the dispersion (D) is substantially free from fluorinated surfactants, the presence of a given number of polar end groups in polymer (A) is generally required in the dispersion (D) for ensuring appropriate colloidal stability. According to these embodiments, the polymer (A) is required to comprise an amount of polar end groups of formula —$CH_2$—OH of generally at least 5.0 mmol/kg, when determined by $^1$H-NMR according to PIANCA, Maurizio, et al. End Groups in fluoropolymers. *Journal of Fluorine Chemistry*. 1999, vol. 95, p. 71-84.

Preferably, in these preferred embodiments, the polymer (A) comprises an amount of polar end groups of formula —$CH_2$—OH of at least 5.5 mmol/kg, preferably of at least 6.0 mmol/kg and/or advantageously at most 15.0 mmol/kg, preferably at most 14.0 mmol/kg, even more preferably at most 13.0 mmol/kg.

Excellent results have been obtained when the polymer (A) comprised an amount of polar end groups of formula —$CH_2$—OH of at least 7.0 mmol/kg, and at most 10.0 mmol/kg.

Further in addition, polymer (A) may comprise, in addition to iodine-containing chain ends and polar end groups of formula —$CH_2$—OH, non-polar end groups, including for instance groups of any of formulae —$CF_2H$ and —$CF_2CH_3$, which may be seen as additional chain ends due to inter-chains terminations and/or due to back-biting intra-chain transfers.

Thanks to the controlled pseudo-living polymerization, in polymer (A) the total amount of end groups of any of formulae —$CF_2H$ and —$CF_2CH_3$ in the polymer (A) is advantageously of not more than 60.0 mmol/kg, preferably of not more than 55.0 mmol/kg, even more preferably of not more than 50.0 mmol/kg. Lower limit for total amount of end groups of formulae —$CF_2H$ and —$CF_2CH_3$ is not particularly limited: it is generally nonetheless understood that an amount of at least 1.0 mmol/kg, preferably at least 1.5 mmol/kg, even more preferably at least 2.0 mmol/kg remains unavoidable, and is not considered to detrimentally affect performances of dispersion (D) and polymer (A).

The invention further pertains to a method of making a dispersion (D) comprising particles of polymer (A), as above detailed, said method comprising emulsion polymerization of VDF in the presence of an inorganic initiator and in the presence of a RAFT/MADIX agent of any general formulae (I) and (II):

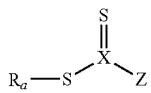

formula (I)

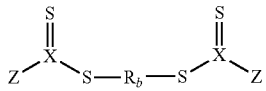

formula (II)

wherein X is carbon or phosphorous, preferably carbon; $R_a$ is a monovalent organic group optionally substituted with one or more hydrophilic groups, $R_b$ is a divalent organic group optionally substituted with one or more hydrophilic groups, and Z is any group that can promote sufficient reactivity of the thiocarbonyl group towards radical addition, wherein the molar ratio between the said RAFT/MADIX agent and the said initiator is of less than 0.050 mol/mol.

The method of the invention is typically carried out in the presence of at least one radical initiator. Generally, for embodiments whereas no fluorosurfactant is added, an inorganic radical initiator will be preferred, due to its ability of generating polar chain ends having a stabilizing effect on particles of polymer (A) in the dispersion (D). Persulfate radical initiators are generally those most used to this aim.

While the choice of the persulfate radical initiator is not particularly limited, it is understood that radical initiators suitable for an aqueous emulsion polymerization process are selected from compounds capable of initiating and/or accelerating the polymerization process and include, but are not limited to, sodium, potassium and ammonium persulfates.

One or more radical initiators as defined above may be added to the aqueous medium as defined above in an amount ranging advantageously from 0.001% to 20% by weight based on the weight of the aqueous medium.

In formulae (I) and (II), Z has preferably the meaning, as above defined for group of formula ($I_x$).

In formulae (I) and (II), X is preferably a carbon atom, that is to say that the RAFT/MADIX agent complies with any general formulae (I') and (II') herein below:

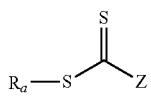

formula (I')

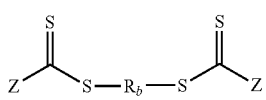

formula (II')

with $R_a$, $R_b$ and Z being as above detailed.

In formula (I), $R_a$ may be selected from $C_1$-$C_{12}$ alkyl, $C_1$-$C_{12}$ alkoxy, aryl or heteroaryl, each of which may be substituted with one or more hydrophilic groups selected from —$CO_2H$, —$CO_2R$, —CN, —$SO_3H$, —$OSO_3H$, —SOR, —$SO_2R$, —OP(OH)$_2$, —P(OH)$_2$, —PO(OH)$_2$, —OH, —OR, —(OCH$_2$—CHR$^0$)$_w$—OH, —(OCH$_2$—CHR$^0$)$_w$—OR, —CONH$_2$, —CONHR$^1$, —CONR$^1$R$^2$, —NR$^1$R$^2$, —NR$^1$R$^2$R$^3$, where R is selected from $C_1$-$C_{12}$ alkyl; w is an integer from 1 to 10; R$^0$ is selected from hydrogen or R; R$^1$, R$^2$ and R$^3$ are independently selected from $C_1$-$C_{12}$ alkyl and aryl which are optionally substituted with one or more hydrophilic substituent selected from —$CO_2H$, —$CO_2R$, —CN, —$SO_3H$, —$OSO_3H$, —$SO_2R$, —OH, —(OCH$_2$CHR$^0$)$_w$—OH, —CONH$_2$, —SOR and $SO_2R$, and salts thereof, wherein R, R$^0$ and w are as defined above.

Preferably $R_a$ is selected, without limitation, from the group consisting of: —CH(CH$_3$)CO$_2$H, —CH(CH$_3$)CO$_2$CH$_3$, —CH(CH$_3$)CO$_2$CH$_2$CH$_3$, —CH(CH$_3$)CO$_2$CH(CH$_3$)$_2$, —CH(CO$_2$H)CH$_2$CO$_2$H, —CH(CO$_2$CH$_3$)CH$_2$CO$_2$CH$_3$, —CH(CO$_2$CH$_2$CH$_3$)CH$_2$CO$_2$CH$_2$CH$_3$, —CH(CO$_2$CH(CH$_3$)$_2$)CH$_2$CO$_2$CH(CH$_3$)$_2$, —C(CH$_3$)$_2$CO$_2$H, —C(CH$_3$)$_2$CO$_2$CH$_3$, —C(CH$_3$)$_2$CO$_2$CH$_2$CH$_3$, —C(CH$_3$)$_2$CO$_2$CH(CH$_3$)$_2$, —CH$_2$(C$_6$H$_5$), —C(CN)(CH$_3$)CO$_2$H, —C(CN)(CH$_3$)CO$_2$CH$_3$, —C(CN)(CH$_3$)CO$_2$CH$_2$CH$_3$, —C(CN)(CH$_3$)CO$_2$CH(CH$_3$)$_2$, —C(CN)(CH$_3$)(CH$_2$)$_2$CO$_2$H, —C(CN)(CH$_3$)(CH$_2$)$_2$CO$_2$CH$_3$, —C(CN)(CH$_3$)(CH$_2$)$_2$CO$_2$CH$_2$CH$_3$, and —C(CN)(CH$_3$)(CH$_2$)$_2$CO$_2$CH(CH$_3$)$_2$.

In formula (II), $R_b$ may be selected from divalent $C_1$-$C_{12}$ aliphatic, aryl or heteroaryl groups, each of which may be substituted with one or more hydrophilic groups selected from —$CO_2H$, —$CO_2R$, —CN, —$SO_3H$, —$OSO_3H$, —SOR, —$SO_2R$, —OP(OH)$_2$, —P(OH)$_2$, —PO(OH)$_2$, —OH, —OR, —(OCH$_2$—CHR$^0$)$_w$—OH, —(OCH$_2$—CHR$^0$)$_w$—OR, —CONH$_2$, —CONHR$^1$, —CONR$^1$R$^2$, —NR$^1$R$^2$, —NR$^1$R$^2$R$^3$, where R is selected from $C_1$-$C_{12}$ alkyl; w is an integer from 1 to 10; R$^0$ is selected from hydrogen or R; R$^1$, R$^2$ and R$^3$ are independently selected from $C_1$-$C_{12}$ alkyl and aryl which are optionally substituted with one or more hydrophilic substituent selected from —$CO_2H$, —$CO_2R$, —CN, —$SO_3H$, —$OSO_3H$, —$SO_2R$, —OH, —(OCH$_2$CHR$^0$)$_w$—OH, —CONH$_2$, —SOR and $SO_2R$, and salts thereof, wherein R, R$^0$ and w are as defined above.

Preferably $R_b$ is selected, without limitation, from the group consisting of: —(CH$_2$)$_p$—, with p being an integer of 1 to 12, preferably of 1 to 6, —CH(CH$_3$)—CH$_2$—CH$_2$—, —CH(C$_2$H$_5$)—CH$_2$—, —CHCO$_2$H—CH$_2$—, —CH(CO$_2$CH$_3$)—CH$_2$—, —CH(CO$_2$CH$_2$CH$_3$)—CH$_2$—, —CH(C$_{O2}$CH(CH$_3$)$_2$)—CH$_2$—, —CH(CO$_2$H)CH(CO$_2$H)—, —CH(CO$_2$CH(CH$_3$)$_2$)CH(CO$_2$CH(CH$_3$)$_2$)—, —CH(CO$_2$CHCH$_3$)CH(CO$_2$CHCH$_3$)—, —CH(CO$_2$CH$_2$CH$_3$)CH(CO$_2$CH$_2$CH$_3$)—, —(CH$_2$)$_{p'}$—CH(C$_6$H$_5$)—(CH$_2$)$_{p''}$— with p' and p", equal to or different from each other, being 0 or an integer of 1 to 6, —(CH$_2$)$_{q'}$—CH(CN)—(CH$_2$)$_{q''}$—, —(CH$_2$)$_{q'}$C(CN)(CH$_3$)—(CH$_2$)$_{q''}$—, with q' and q", equal to or different from each other, being 0 or an integer of 1 to 6.

A RAFT/MADIX agent which has been found particularly effective within the context of the present invention, in particular in combination with persulfate initiator, is O-ethyl S-(1-methoxycarbonyl ethyl)dithiocarbonate, which has formula:

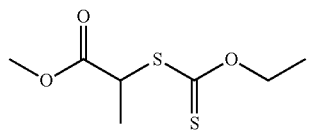

which is notably commercially available from Solvay as Rhodixan® A1.

As explained above, the molar ratio between the said initiator and the said RAFT/MADIX agent is of less than 0.050 mol/mol. The Applicant has surprisingly found that such low amount of RAFT/MADIX agent is effective in promoting pseudo-living character to the polymerization while enabling achieving high molecular weight (i.e. with minimum chain transfer/termination effect) and avoiding any modification in the final polymer (A) performances. The said amount is preferably such to provide for a molar ratio RAFT/MADIX agent/initiator of at most 0.048, more preferably at most 0.045 mol/mol, even more preferably at most 0.040 mol/mol.

While the lower boundaries for the said RAFT/MADIX chain transfer agent is not particularly limited, the same is generally used in an amount such to provide for a molar ratio RAFT/MADIX agent/initiator of at least 0.005, preferably at least 0.015, more preferably at least 0.020 mol/mol.

As said, the method is preferably carried out with no addition of a fluorinated surfactant (FS) complying with formula (III) here below:

$$R_{fS}(X^-)_k(M^+)_k \tag{III}$$

wherein:

$R_{fS}$ is selected from a $C_5$-$C_{16}$ (per)fluoroalkyl chain, optionally comprising one or more catenary or non-catenary oxygen atoms, and a (per)fluoropolyoxyalkyl chain, $X^-$ is selected from —COO$^-$, —PO$_3^-$ and —SO$_3^-$, $M^+$ is selected from NH$_4^+$ and an alkaline metal ion, and k is 1 or 2.

Non-limitative examples of fluorinated surfactants (FS) whose presence is substantially avoided in dispersion (D) are the followings:
(a) $CF_3(CF_2)_{n0}COOM'$, wherein $n_0$ is an integer ranging from 4 to 10, preferably from 5 to 7, preferably $n_1$ being equal to 6, and M' represents NH$_4$, Na, Li or K, preferably NH$_4$;
(b) T-$(C_3F_6O)_{n1}(CFXO)_{m1}CF_2COOM''$, wherein T represents a Cl atom or a perfluoroalkoxyde group of formula $C_xF_{2x+1-x}Cl_xO$, wherein x is an integer ranging from 1 to 3 and x' is 0 or 1, $n_1$ is an integer ranging from 1 to 6, $m_1$ is an integer ranging from 0 to 6, M'' represents NH$_4$, Na, Li or K and X represents F or —CF$_3$;
(c) F—$(CF_2CF_2)_{n2}$—CH$_2$—CH$_2$—RO$_3$M''', in which R is a phosphorus or a sulphur atom, preferably R being a sulphur atom, M''' represents NH$_4$, Na, Li or K and $n_2$ is an integer ranging from 2 to 5, preferably $n_2$ being equal to 3;
(d) A-$R_{bf}$—B bifunctional fluorinated surfactants, wherein A and B, equal to or different from each other, have formula —(O)$_p$CFX''—COOM*, wherein M* represents NH$_4$, Na, Li or K, preferably M* representing NH$_4$, X'' is F or —CF$_3$ and p is an integer equal to 0 or 1, and $R_{bf}$ is a divalent (per)fluoroalkyl or (per)fluoropolyether chain such that the number average molecular weight of A-$R_{bf}$—B is in the range of from 300 to 1800; and
(e) mixtures thereof.

Still another object of the invention is a powder [powder (P)] comprising particles of a vinylidene fluoride (VDF) polymer [polymer (A)] comprising recurring units derived from vinylidene fluoride (VDF) monomer, said polymer (A)

(i) comprising more than 85.0% moles of recurring units derived from VDF, with respect to the total number of recurring units of polymer (A);
(ii) having sulphur-containing chain ends;
(iii) possessing a weight averaged molecular weight ($M_w$) of at least 500 KDalton, when measured by GPC, using N,N-dimethylacetamide (DMA) as solvent, against monodisperse polystyrene standards;
wherein the relation between melt viscosity (MV) in KPoise determined at a shear rate of 100 sec-1, and at a temperature of 230° C., according to ASTM D3835, and $M_w$, expressed in KDalton, satisfies the following inequality:

$$0.025 \times M_w(\text{KDalton}) + 13 \leq MV(\text{KPoise}) \leq 0.050 \times M_w(\text{KDalton}) + 10,$$

wherein said particles of polymer (A) possess a primary particle average size of less than 1 μm.

All the features described above in connection with dispersion (D) and polymer (A) are applicable mutatis mutandis to powder (P).

Powder (P) may be obtained by known techniques from dispersion (D), as detailed above; notably, powder (P) may be obtained by coagulation, e.g. shear or temperature-induced coagulation, or may be obtained by spray-drying or other drying or liquid/solid separation.

Still another object of the present invention is a polymer (A), possessing the features as above detailed.

An aqueous electrode-forming composition may be obtained by adding and dispersing a powdery electrode material (an active substance for a battery or an electric double layer capacitor), and optional additives, such as an electro-conductivity-imparting additive and/or a viscosity modifying agent, into the dispersion (D), as above detailed.

A solvent-based electrode-forming composition may be obtained by solubilizing powder (P) or polymer (A), as detailed above, in a polar organic solvent, so as to obtain a binder solution, and by adding and dispersing into the said solution a powdery electrode material as above detailed, and optional additives, such as an electro-conductivity-imparting additive and/or a viscosity modifying agent, as above detailed.

Hence other objects of the invention are:
an aqueous electrode-forming composition comprising dispersion (D), as above detailed, a powdery electrode material and, optionally, an electro-conductivity-imparting additive and/or a viscosity modifying agent; and/or
a solvent-based electrode-forming composition comprising polymer (A), as above detailed, a polar organic solvent, a powdery electrode material and, optionally, an electro-conductivity-imparting additive and/or a viscosity modifying agent.

The polar organic solvent comprised in the solvent-based electrode-forming composition and/or notably used for dissolving the polymer (A) to provide the binder solution according to the present invention may preferably be one or more than one of: N-methyl-2-pyrrolidone, dimethylformamide, N,N-dimethylacetamide, N,N-dimethylsulfoxide, hexamethylphosphamide, dioxane, tetrahydrofuran, tetramethylurea, triethyl phosphate, and trimethyl phosphate. As the polymer (A) used in the present invention has a much larger polymerization degree than a conventional one, it is further preferred to use a nitrogen-containing organic solvent having a larger dissolving power, such as N-methyl-2-pyrrolidone, dimethylformamide or N,N-dimethylacetamide among the above-mentioned organic solvents. These organic solvents may be used singly or in mixture of two or more species.

For obtaining the binder solution of polymer (A) as above detailed, it is preferred to dissolve 0.1-10 wt. parts, particularly 1-5 wt. parts, of the polymer (A) in 100 wt. parts of such an organic solvent. Below 0.1 wt. part, the polymer occupies too small a proportion in the solution, thus being liable to fail in exhibiting its performance of binding the powdery electrode material. Above 10 wt. parts, an abnormally high viscosity of the solution is obtained, so that the preparation of the electrode-forming composition becomes difficult.

In order to prepare the polymer (A) binder solution, it is preferred to dissolve the polymer (A) in an organic solvent at a temperature of 30-200° C., more preferably 40-160° C., further preferably 50-150° C. Below 30° C., the dissolution requires a long time and a uniform dissolution becomes difficult.

Among viscosity modifying agents, a thickener may be added in order to prevent or slow down the settling of the powdery electrode material from the aqueous or solvent-based electrode forming compositions of the invention. One of ordinary skills in the art would select the most appropriate thickener depending upon the nature of the composition at stake. Non-limitative examples of suitable thickeners include, notably, organic thickeners such as partially neutralized poly(acrylic acid) or poly(methacrylic acid), carboxylated alkyl cellulose like carboxylated methyl cellulose and inorganic thickeners such as natural clays like montmorillonite and bentonite, manmade clays like laponite and others like silica and talc.

In the case of forming a positive electrode for a lithium ion battery, the active substance may be selected from the group consisting of:
  composite metal chalcogenide represented by a general formula of $LiMY_2$, wherein M denotes one or more than one transition metal, including Co, Ni, Fe, Mn, Cr and V; and Y denotes a chalcogen, including O and S;
  lithiated or partially lithiated transition metal oxyanion-based electrode materials of the nominal formula $AB(XO_4)_fE_{1-f}$, in which A is lithium, which may be partially substituted by another alkali metal representing less than 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, which is comprised between 0.75 and 1.

Preferred examples thereof may include: $LiFePO_4$, $LiCoO_2$, $LiNiO_2$, $LiMnO_2$ $LiNi_xCo_{1-x}O_2$ (0<x<1), $Li_xCo_{1-y}Al_yO_2$ (0<x<1, 0<y<1) and spinel-structured $LiMn_2O_4$; nevertheless a broader range of chalcogenide might be considered, including those represented by formulae:

$$Li_xMn_{1-y}M'_yA_2 \tag{1}$$

$$Li_xMn_{1-y}M'_yO_{2-z}Z_z \tag{2}$$

$$Li_xMn_2O_{4-z}A_z \tag{3}$$

$$Li_xMn_{2-y}M'_yA_4 \tag{4}$$

$$Li_xM_{1-y}M''_yA_2 \tag{5}$$

$$Li_xMO_{2-z}A_z \tag{6}$$

$$Li_xNi_{1-y}Co_yO_{2-z}A_z \tag{7}$$

$$Li_xNi_{1-y-z}Co_yM''_zA_a \tag{8}$$

$$Li_xNi_{1-y-z}Co_yM''_zO_{2-a}Z_a \tag{9}$$

$$Li_xNi_{1-y-z}Mn_yM'_zA_a \tag{10}$$

$$Li_xNi_{1-y-z}Mn_yM'_zO_{2-a}Z_a \tag{11}$$

wherein:
  $0.95 \leq x \leq 1.1$, $0 \leq y \leq 0.5$, $0 \leq z \leq 0.5$, $0 \leq a \leq 2$;
  M is Ni or Co, M' is one or more elements selected from a group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, M'' is one or more elements selected from a group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, A is selected from the group consisting of O, F, S and P, and Z is selected from the group consisting of F, S, and P Among composite metal chalcogenide, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$.

In the case of forming a negative electrode for a lithium battery, active substance may be selected from the group consisting of:
  carbonaceous materials (e.g. graphitic carbons) able to intercalate lithium, typically existing in forms such as powders, flakes, fibers or spheres (for example, mesocarbon microbeads) hosting lithium;
  lithium metal;
  lithium alloy compositions, including notably those described in U.S. Pat. No. 6,203,944 (3M INNOVATIVE PROPERTIES CO.) 20/03/2001 and/or in WO 00/03444 (MINNESOTA MINING AND MANUFACTURING CO.) 10/06/2005;
  lithium titanates, generally represented by formula $Li_4Ti_5O_{12}$; these compounds are generally considered as "zero-strain" insertion materials, having low level of physical expansion upon taking up the mobile ions, i.e. $Li^+$;
  lithium-silicon alloys, generally known as lithium silicides with high Li/Si ratios, in particular lithium silicides of formula $Li_{4.4}Si$;
  lithium-germanium alloys, including crystalline phases of formula $Li_{4.4}Ge$.

In these embodiments the active substance may preferably comprise a carbonaceous material, such as graphite, activated carbon or a carbonaceous material obtained by carbonization of phenolic resin, pitch, etc. The carbonaceous material may preferably be used in the form of particles having an average diameter of ca. 0.5-100 μm.

An electro-conductivity-imparting additive may be added in order to improve the conductivity of a resultant composite electrode layer formed by applying and drying of the electrode-forming composition of the present invention, particularly in case of using an active substance, such as $LiCoO_2$, showing a limited electron-conductivity. Examples thereof may include: carbonaceous materials, such as carbon black, graphite fine powder and fiber, and fine powder and fiber of metals, such as nickel and aluminium.

The active substance for an electric double layer capacitor may preferably comprise fine particles or fiber, such as activated carbon, activated carbon fiber, silica or alumina particles, having an average particle (or fiber) diameter of 0.05-100 μm and a specific surface area of 100-3000 m²/g, i.e., having a relatively small particle (or fiber) diameter and a relatively large specific surface area compared with those of active substances for batteries.

The preferred electrode-forming compositions (be those aqueous or solvent-based) for positive electrodes comprises:
(a) polymer (A), in an amount from 1 to 10% wt, preferably from 2 to 9% wt, more preferably about 3% wt, with respect to the total weight (a)+(b)+(c);
(b) carbon black as electroconductivity-imparting additive, in an amount from 2 to 10% wt, preferably from 4 to 6% wt, more preferably about 5% wt, with respect to the total weight (a)+(b)+(c);
(c) a powdery electrode material, preferably a composite metal chalcogenide represented by a general formula of $LiMY_2$, as above detailed, in an amount from 80 to 97% wt, preferably from 85 to 94% wt, more preferably about 92% wt.

An aqueous coating composition suitable for coating separators can be obtained by adding and dispersing a non-electroactive inorganic filler material, and optional additives, into the dispersion (D), as above detailed.

Also an object of the invention is thus an aqueous coating composition [composition (AC)] comprising dispersion (D), as above detailed, at least one non-electroactive inorganic filler material and, optionally, one or more than one additional additive.

By the term "non-electroactive inorganic filler material", it is hereby intended to denote an electrically non-conducting inorganic filler material which is suitable for the manufacture of an electrically insulating separator for electrochemical cells.

The non-electroactive inorganic filler material in the separator according to the invention typically has an electrical resistivity (p) of at least $0.1 \times 10^{10}$ ohm cm, preferably of at least $0.1 \times 10^{12}$ ohm cm, as measured at 20° C. according to ASTM D 257. Non-limitative examples of suitable non-electroactive inorganic filler materials include, notably, natural and synthetic silicas, zeolites, aluminas, titanias, metal carbonates, zirconias, silicon phosphates and silicates and the like. The non-electroactive inorganic filler material is typically under the form of particles having an average size of from 0.01 μm to 50 μm, as measured according to ISO 13321.

Optional additives in composition (AC) include notably viscosity modifiers, as detailed above, anti-foams, non-fluorinated surfactants, and the like.

Among non-fluorinated surfactants, mention can be made of non-ionic emulsifiers, such as notably alkoxylated alcohols, e.g. ethoxylates alcohols, propoxylated alcohols, mixed ethoxylated/propoxylated alcohols; of anionic surfactants, including notably fatty acid salts, alkyl sulfonate salts (e.g. sodium dodecyl sulfate), alkylaryl sulfonate salts, arylalkyl sulfonate salts, and the like.

The composition (AC) may be obtained from the dispersion (D), e.g. (i) by formulating dispersion (D) with optional additives, as above detailed, (ii) by upconcentrating dispersion (D), notably through standard techniques like ultrafiltration, clouding, and the like, (iii) by using dispersion (D) as such, as obtained from emulsion polymerization, (iv) by diluting dispersion (D) with water, or through a combination of above techniques.

Generally, the composition (AC) is obtained by mixing:
(i) dispersion (D), as above detailed, in an amount of from 5 to 25% wt;
(ii) at least one non-electroactive inorganic filler material, in an amount of from 70 to 95% wt;
(iii) one or more than one additional additive, in an amount of 0 to 5% wt; and optionally, adding water for adjusting solid contents in the range of 30 to 80% wt, preferably 40 to 60% wt.

The solid content of the composition (AC) is understood to be cumulative of all non-volatile ingredients thereof, notably including polymer (A) and non-electroactive inorganic filler material.

Still another object of the present invention is a method for the manufacture of a composite separator notably suitable for use in an electrochemical cell, said method comprising the following steps:
(i) providing a porous substrate;
(ii) providing an aqueous coating composition comprising dispersion (D), as above detailed, at least one non-electroactive inorganic filler material and, optionally, at least one or more than one additional additive, i.e. the composition (AC), as above detailed;
(iii) applying said composition (AC) onto at least one surface of said porous substrate to provide a coating composition layer; and
(iv) drying said coating composition layer at a temperature of at least 60° C., to provide said composite separator.

By the term "separator", it is hereby intended to denote a porous polymeric material which electrically and physically separates electrodes of opposite polarities in an electrochemical cell and is permeable to ions flowing between them.

By the term "electrochemical cell", it is hereby intended to denote an electrochemical cell comprising a positive electrode, a negative electrode and a liquid electrolyte, wherein a monolayer or multilayer separator is adhered to at least one surface of one of said electrodes.

Non-limitative examples of electrochemical cells include, notably, batteries, preferably secondary batteries, and electric double layer capacitors.

For the purpose of the present invention, by "secondary battery" it is intended to denote a rechargeable battery. Non-limitative examples of secondary batteries include, notably, alkaline or alkaline-earth secondary batteries.

The composite separator obtained from the method of the invention is advantageously an electrically insulating composite separator suitable for use in an electrochemical cell.

In step (iii) of the method of the invention, the composition (AC) is typically applied onto at least one surface of the porous substrate by a technique selected from casting, spray coating, roll coating, doctor blading, slot die coating, gravure coating, ink jet printing, spin coating and screen printing, brush, squeegee, form applicator, curtain coating, vacuum coating.

Non-limitative examples of suitable porous substrate include, notably, porous membranes made from inorganic, organic and naturally occurring materials, and in particular made from nonwoven fibers (cotton, polyamides, polyesters, glass), from polymers (polyethylene, polypropylene, poly (tetrafluoroethylene), poly(vinyl chloride), and from certain fibrous naturally occurring substances (e.g. asbestos).

Advantageous results have been obtained when the porous support was a polyolefin porous support, e.g. a polyethylene or a polypropylene porous support.

In step (iv) of the method of the invention, the coating composition layer is dried preferably at a temperature comprised between 60° C. and 200° C., preferably between 70° C. and 180° C.

Still another object of the present invention is a method of making a membrane comprising using powder (P) or polymer (A), as described above.

The term "membrane" is used herein in its usual meaning, that is to say it refers to a discrete, generally thin, interface that moderates the permeation of chemical species in contact with it. This interface may be molecularly homogeneous, that is, completely uniform in structure (dense membrane), or it may be chemically or physically heterogeneous, for example containing voids, holes or pores of finite dimensions (porous membrane).

Porous membranes are generally characterized by the average pore diameter and the porosity, i.e. the fraction of the total membrane that is porous.

Membranes having a uniform structure throughout their thickness are generally known as symmetrical membranes, which can be either dense or porous; membranes having pores which are not homogeneously distributed throughout their thickness are generally known as asymmetric membranes. Asymmetric membranes are characterized by a thin selective layer (0.1-1 µm thick) and a highly porous thick layer (100-200 µm thick) which acts as a support and has little effect on the separation characteristics of the membrane.

Membranes can be in the form of a flat sheet or in the form of tubes. Tubular membranes are classified based on their dimensions in tubular membranes having a diameter greater than 3 mm; capillary membranes, having a diameter comprised between 0.5 mm and 3 mm; and hollow fibers having a diameter of less than 0.5 mm. Oftentimes capillary membranes are also referred to as hollow fibres.

Flat sheet membranes are generally preferred when high fluxes are required whereas hollow fibres are particularly advantageous in applications where compact modules with high surface areas are required.

Depending on their applications membranes may also be supported to improve their mechanical resistance. The support material is generally selected to have a minimal influence on the selectivity of the membrane.

Said support material may be any of non-woven materials, glass fibers and/or polymeric materials such as for example polypropylene, polyethylene, polyethyleneterephthalate.

Said method of making a membrane advantageously comprises the steps of:
(i) preparing a solution [solution ($S^M$)] comprising:
  polymer (A);
  optionally, at least one pore forming agent [agent (P)]; and
  a polar organic solvent;
(ii) processing said solution ($S^M$) into a film; and
(iii) immersing said film in a non-solvent bath.

The polar organic solvent used in the method above has same features as the one described above in connection with the solvent-based electrode-forming composition; may preferably be one or more than one of: N-methyl-2-pyrrolidone, dimethylformamide, N,N-dimethylacetamide, N,N-dimethylsulfoxide, hexamethylphosphamide, dioxane, tetrahydrofuran, tetramethylurea, triethyl phosphate, and trimethyl phosphate; and more preferably one or more than one of: N-methyl-2-pyrrolidone, dimethylformamide and N,N-dimethylacetamide.

Pore forming agents are generally selected among compounds which have solubility in the polar organic solvent and in the non-solvent bath, So that they will be at least partially removed from the membrane which will be formed, providing for porosity.

It is generally understood that while inorganic compounds like lithium chloride can be used, as well as monomeric organic compounds, including maleic anhydride, polymeric pore forming agents are generally preferred.

In particular, the polymeric pore forming agent is preferably selected from the group consisting of poly(alkylene oxide) and derivatives thereof (POA) and polyvinylpyrrolidone (PVP).

The poly(alkylene oxide) (PAO) are polymers obtained from polymerizing alkylene oxides including ethylene oxide, propylene oxide and mixtures thereof.

Derivatives of PAO can be obtained by reacting hydroxyl end groups thereof with suitable compounds, so as to generate notably ether groups, in particular alkyl ethers, ester groups, for instance acetates and the like.

Nevertheless, PAO having hydroxyl end groups are generally used.

Among PAO, polyethyelene oxide (PEO or PEG) polymers are particularly preferred.

The polyvinylpyrrolidone (PVP) is generally a homopolymer, although copolymers of vinylpyrrolidone with other monomers can be advantageously used, said monomers being generally selected from the group consisting of N-vinylcaprolactam, maleic anhydride, methylmethacrylate, styrene, vinyl acetate, acrylic acid, dimethylaminoethylmethacrylate. Nevertheless PVP homopolymers are generally employed.

Molecular weight of PVP is not particularly limited. It is nevertheless understood that relatively high molecular weight of PVP are preferred to the sake of processing the solution ($S^M$) into a membrane. Hence the K value of the PVP, universally recognized as suitable measure of its molecular weight, is generally of at least 10.

When used, the amount of agent (P) is generally comprised between 0.1 and 5% wt, preferably between 0.5 and 3.5% wt.

The solution ($S^M$) can be prepared in step (i) by any conventional manner.

The solution ($S^M$) is prepared at a temperature of advantageously at least 25° C., preferably at least 30° C., more preferably at least 40° C. and even more preferably at least 50° C. The solution ($S^M$) is prepared at a temperature of advantageously less than 180° C., preferably less than 170° C., more preferably less than 160° C., and even more preferably less than 150° C. Higher temperatures can of course be used for the solution ($S^M$) preparation step (i), however they are not preferred from a practical and/or economical point of view.

The overall concentration of the polymer (A) in the solution ($S^M$) should be at least 10% by weight, preferably at least 12% by weight, based on the total weight of the solution. Typically the concentration of the polymer (A) in the solution does not exceed 50% by weight, preferably it does not exceed 40% by weight, more preferably it does not exceed 30% by weight, based on the total weight of the solution ($S^M$).

The mixing time required to obtain the solution ($S^M$) can vary widely depending upon the rate of solution of the components, the temperature, the efficiency of the mixing apparatus, the viscosity of the solution ($S^M$) being prepared, and the like. It has been advantageously observed that, thanks to the peculiar microstructure of polymer (A), solution ($S^M$) advantageously possess a liquid viscosity lower than that of corresponding solution comprising a suspension-polymerized VDF polymer of analogous $M_w$, which is an interesting advantage for processability.

Any suitable mixing equipment may be used. Preferably, the mixing equipment is selected to reduce the amount of air entrapped in the solution ($S^M$) which may cause defects in the final membrane. The mixing of the polymer (A) and the polar organic solvent may be conveniently carried out in a sealed container, optionally held under an inert atmosphere. Inert atmosphere, and more precisely nitrogen atmosphere has been found particularly advantageous for the preparation of solution ($S^M$) comprising PVP.

In step (ii), the solution ($S^M$) is processed into a film.

The term "film" is used herein to refer to the layer of solution ($S^M$) obtained after the processing of the same. Depending on the final form of the membrane the film may be either flat, when flat membranes are required, or tubular in shape, when tubular or hollow fiber membranes are to be obtained.

Conventional techniques can be used for processing the solution ($S^M$) into a film, being understood that casting techniques are preferred.

Different casting techniques are used depending on the final form of the membrane to be manufactured. When the final product is a flat membrane the polymer solution is cast as a film over a flat support, typically a plate, a belt or a fabric, or another microporous supporting membrane, by means of a casting knife or a draw-down bar.

Accordingly, in its first embodiment the method of the invention comprises a step (ii) of casting the solution ($S^M$) into a flat film on a support.

Hollow fibers and capillary membranes can be obtained by the so-called wet-spinning process. In such a process the solution ($S^M$) is generally pumped through a spinneret, that is an annular nozzle comprising at least two concentric capillaries: a first outer capillary for the passage of the solution ($S^M$) and a second inner one for the passage of a supporting fluid, generally referred to as "lumen". The lumen acts as the support for the casting of the solution ($S^M$) and maintains the bore of the hollow fiber or capillary precursor open. The lumen may be a gas, or, preferably, a liquid at the conditions of the spinning of the fiber. The selection of the lumen and its temperature depends on the required characteristics of the final membrane as they may have a significant effect on the size and distribution of the pores in the membrane. In general the lumen is not a strong non-solvent for the polymer (A) or, alternatively, it contains a solvent or weak solvent for the polymer (A). The lumen is typically miscible with the non-solvent and with the polar organic solvent of the polymer (A).

At the exit of the spinneret, after a short residence time in air or in a controlled atmosphere, the hollow fiber or capillary precursor is immersed in the non-solvent bath wherein the polymer (A) precipitates forming the hollow fiber or capillary membrane.

Accordingly, in its second embodiment the process of the invention comprises a step (ii) of casting the polymer solution into a tubular film around a supporting fluid.

The casting of the polymer solution is typically done through a spinneret.

The supporting fluid forms the bore of the final hollow fiber or capillary membrane. When the supporting fluid is a liquid, immersion of the fiber precursor in the non-solvent bath also advantageously removes the supporting fluid from the interior of the fiber.

Tubular membranes, because of their larger diameter, are produced using a different process from the one employed for the production of hollow fiber membranes.

In its third embodiment the process of the invention comprises a step (ii) of casting the polymer solution into a tubular film over a supporting tubular material.

After the processing of the solution ($S^M$) has been completed so as to obtain a film, in whichever form, as above detailed, said film is immersed into a non-solvent bath in step (iii). This step is generally effective for inducing the precipitation of the polymer (A) from the solution ($S^M$). The precipitated polymer (A) thus advantageously forms the final membrane structure.

As used herein the term "non-solvent" is taken to indicate a substance incapable of dissolving a given component of a solution or mixture.

Suitable non-solvents for the polymer (A) are water and aliphatic alcohols, preferably, aliphatic alcohols having a short chain, for example from 1 to 6 carbon atoms, more preferably methanol, ethanol and isopropanol. Blends of said preferred non-solvents, i.e. comprising water and one or more aliphatic alcohols can be used. Preferably, the non-solvent of the non-solvent bath is selected from the group consisting of water, aliphatic alcohols as above defined, and mixture thereof. Further in addition, the non-solvent bath can comprise in addition to the non-solvent (e.g. in addition to water, to aliphatic alcohol or to mixture of water and aliphatic alcohols, as above detailed) small amounts (typically of up to 40% wt, with respect to the total weight of the non-solvent bath, generally 25 to 40% wt)) of a solvent for the polymer (A). Use of solvent/non-solvent mixtures advantageously allows controlling the porosity of the membrane. The non-solvent is generally selected among those miscible with the polar organic solvent used for the preparation of the solution ($S^M$). Preferably the non-solvent in the process of the invention is water. Water is the most inexpensive non-solvent and it can be used in large amounts.

When used, the pore forming agent (P) is generally at least partially, if not completely, removed from the membrane in the non-solvent bath in step (iii).

Once removed from the precipitation bath the membrane may undergo additional treatments, for instance rinsing. As a last step the membrane is typically dried.

The invention further pertains to a membrane obtained by the method as above described. In particular, the invention pertains to a membrane comprising polymer (A), as detailed above.

The membrane obtained from the process of the invention is preferably a porous membrane. Typically the membrane has an asymmetric structure.

The porosity of the membrane may range from 3 to 90%, preferably from 5 to 80%.

The pores may have an average diameter of at least 0.001 µm, of at least 0.005 µm, of at least 0.01 µm, of at least 0.1 µm, of at least 1 µm, of at least 10 µm and of at most 50 µm.

Should the disclosure of any patents, patent applications, and publications which are incorporated herein by reference conflict with the description of the present application to the extent that it may render a term unclear, the present description shall take precedence.

The invention is described hereunder in more detail with reference to the following examples, which are provided with the purpose of merely illustrating the invention, with no intention to limit its scope.

Determination of End Groups

$^1$H-NMR technique has been used for determination of end groups according to the technique described in PIANCA, Maurizio, et al. End Groups in fluoropolymers.

*Journal of Fluorine Chemistry.* 1999, vol. 95, p. 71-84. To this aim, about 20 mg of polymer were dissolved in 0.7 ml of hexadeuteroacetone. The $^1$H-NMR spectrum revealed notably a triplet at 3.78 ppm with a J coupling F—H equal to 14 Hz that is related to —CH$_2$—OH end group.

Determination of Total Average Monomer (MA) Content

Total average monomer (MA) content in vinylidene fluoride (VDF) polymers was determined by acid-base titration.

A sample of 1.0 g of polymer was dissolved in acetone at a temperature of 70° C. Water (5 ml) was then added dropwise under vigorous stirring so as to avoid coagulation of the polymer. Titration with aqueous NaOH having a concentration of 0.01 N until complete neutralization of acidity was then carried out, with neutrality transition at about −170 mV.

Determination of Melt Viscosity

Melt Viscosity (According to ASTM D3835) was measured to demonstrate the improvement of molecular weight. The test was performed in a Capillary Rheomether Rheograph 2003 in a configuration (L/D=20) at 230° C. with a die diameter of 1 mm. Measurements of MV were carried out at a shear rate of 100 sec$^{-1}$.

Determination of Weight Averaged Molecular

Molecular weight was measured by GPC. Sample preparation: dissolution of powder, obtained by coagulation, 0.25% wt/vol in DMA+LiBr 0.01N at 45° C. under stirring for two hours and further centrifugation at 20000 rpm for 60 minutes at room temperature using a Sorvall RC-6 Plus centrifuge (rotor model: F21S—8X50Y).

The supernatant of each sample was analysed using instrumentation and conditions below detailed:

Mobile phase: DMA
Flow rate: 1 mL/min.
Temperature: 45° C.
Injection system: Waters 717plus Autosampler.
Injection volume: 200 μL.
Pump: Waters Isocratic Pump model 515.
Columns: Four Water Styragel HT (300×7.5) mm, 10 μm particle size: Styragel HT-6, HT-5, HT-4, HT-3 with guard column.
Detector: Waters refractive index model 2414.
Software for data acquisition and processing: Waters Empower.

Determination of Gel Content

A sample of the obtained latex was dried by cryogenic coagulation technique, submitting the said latex to freezing; a weighted amount of so obtained powder was contacted with N,N-dimethylacetamide (DMA) containing LiBr at a concentration of 0.01N, in a weight ratio 1:375, at a temperature of 45° C. for 4 hours. The mixtures so obtained were submitted to centrifugation for 3600 seconds at 20000 rpm, and a liquid phase was separated from a precipitated residue. Gels content was determined by weighing the said residue, after drying at a temperature of 150° C. for 48 hours, and dividing the same by the overall weight of the coagulated powder specimen.

Example 1—Manufacture of Aqueous
VDF-HFP-AA Polymer Latex—Polymer
A1—Using Rhodixan® A1 [O-ETHYL
S-(1-METHOXYCARBONYL
ETHYL)DITHIOCARBONATE]

In a 21 lt. horizontal reactor autoclave equipped with baffles and stirrer working at 50 rpm, 13.5 lt. of deionised water were introduced. The temperature is brought to 80° C., 2.0 ml of Rhodixan® A1 solution was added and the pressure of 35 Bar ass was maintained constant throughout the whole trial by feeding VDF/HFP gaseous mixture monomers in a molar ratio of 99:1 respectively. 250 ml of a 100 g/l aqueous solution of ammonium persulfate (APS) were added over a period of 20 minutes (1 L/h) then the solution of ammonium persulfate (APS) was continuously added at a flux rate of 70 ml/h for the whole duration of the run; in addition, 50 ml of a solution of acrylic acid (AA) (50 g/l of acrylic acid in water) were fed every 250 g of monomers consumed.

When 4500 g of the mixture were fed, the feeding mixture was interrupted, then the pressure was let to fall down up to 12 bar while keeping the reaction temperature constant. Final reaction time was 250 min.

The reactor was cooled to room temperature and latex was recovered. The VDF-HFP-AA polymer so obtained contained 98.7% by moles of VDF, about 0.8% by moles of HFP and 0.5% by moles of acrylic acid (AA) monomer. The final ratio Rhodixan® A1/APS was 0.04 mol/mol The aqueous latex so obtained had a solid content of 25.5 by weight.

The VDF-HFP-AA polymer was dispersed in the aqueous latex under the form of particles having an average primary size of 139 nm, as measured according to ISO 13321, was found to possess a melting point of 154.7° C. (determined according to ASTM D3418) a MV (230° C./100 sec$^{-1}$) of 38.1 kPoise, a Mw of 735 kmol, a gels content of <3% and a content of end groups as follows: —CF$_2$H: 24 mmol/kg; —CF$_2$—CH$_3$: 23 mmol/kg; —CH$_2$OH: 16 mmol/kg; the presence of sulphur-containing chain ends was confirmed by elemental analysis and NMR spectroscopy.

Comparative Example 1—Manufacture of Aqueous
VDF-AA Polymer Latex—Polymer C1

In a 21 lt. horizontal reactor autoclave equipped with baffles and stirrer working at 50 rpm, 13.5 lt. of deionised water were introduced. The temperature is brought to 80° C. and the pressure of 35 Bar abs was maintained constant throughout the whole trial by feeding VDF/HFP gaseous mixture monomers in a molar ratio of 99:1 respectively. 250 ml of a 100 g/l aqueous solution of ammonium persulfate (APS) were added over a period of 20 minutes (1 L/h) then the solution of ammonium persulfate (APS) was continuously added at a flux rate of 60 ml/h for the whole duration of the run; in addition, 50 ml of a solution of acrylic acid (AA) (50 g/l of acrylic acid in water) were fed every 250 g of monomers consumed.

When 4500 g of the mixture were fed, the feeding mixture was interrupted, then the pressure was let to fall down up to 12 bar while keeping the reaction temperature constant. Final reaction time was 183 min. The reactor was cooled to room temperature and latex was recovered. The VDF-HFP-AA polymer so obtained contained 98.6% by moles of VDF, about 1.0% by moles of HFP and 0.4% by moles of acrylic acid (AA) monomer.

The aqueous latex so obtained had a solid content of 24.9% by weight. The VDF-HFP-AA polymer was dispersed in the aqueous latex under the form of particles having an average primary size of 221 nm, as measured according to ISO 13321, was found to possess a melting point of 153° C. (determined according to ASTM D3418) a MV (230° C./100 sec$^{-1}$) of 60 kPoise, a Mw of 470 kDalton, a gels content of 55% and a content of end groups as follows: —CF$_2$H: 43 mmol/kg; —CF$_2$—CH$_3$: 47 mmol/kg; —CH$_2$OH: 9 mmol/kg. No iodine-containing end group was found to be present, which is consistent with the fact that no iodine-containing chain transfer agent was used.

Comparative Example 2—Manufacture of Aqueous VDF-AA Polymer Latex—Polymer C2

In a 2l lt. horizontal reactor autoclave equipped with baffles and stirrer working at 50 rpm, 13.5 lt. of deionised water were introduced. The temperature is brought to 80° C., 13.5 ml at 6.6% vol/vol aqueous solution of ethyl acetate (AcOEt) was added and the pressure of 35 Bar abs was maintained constant throughout the whole trial by feeding VDF/HFP gaseous mixture monomers in a molar ratio of 99:1 respectively. 250 ml of a 100 g/l aqueous solution of ammonium persulfate (APS) were added over a period of 20 minutes (1 L/h) then the solution of ammonium persulfate (APS) was continuously added at a flux rate of 60 ml/h for the whole duration of the run; in addition, 50 ml of a solution of acrylic acid (AA) (50 g/l of acrylic acid in water) were fed every 250 g of monomers consumed.

When 4500 g of the mixture were fed, the feeding mixture was interrupted, then the pressure was let to fall down up to 12 bar while keeping the reaction temperature constant. Final reaction time was 211 min. The reactor was cooled to room temperature and latex was recovered.

The VDF-HFP-AA polymer so obtained contained 98.7% by moles of VDF, about 0.9% by moles of HFP and 0.4% by moles of acrylic acid (AA) monomer. The final ratio AcOEt/APS was 0.05 mol/mol.

The aqueous latex so obtained had a solid content of 23.2% by weight. The VDF-HFP-AA polymer was dispersed in the aqueous latex under the form of particles having an average primary size of 330 nm, as measured according to ISO 13321, was found to possess a melting point of 153.2° C. (determined according to ASTM D3418) a MV (230° C./100 sec$^{-1}$) of 49.9 kPoise, a $M_w$ of 596 kDalton, a gels content of 35% and a content of end groups as follows: —$CF_2H$: 45 mmol/kg; —$CF_2$—$CH_3$: 42 mmol/kg; —$CH_2OH$: 9 mmol/kg. Similarly as above, no iodine-containing end group was found to be present, which is consistent with the fact that no iodine-containing chain transfer agent was used.

Table below provides an overview of chain ends detected in the polymers so obtained.

TABLE 1

| Chain ends in mmol/kg of polymer | | | |
|---|---|---|---|
| | Ex. 1 | Ex. 1C | Ex. 2C |
| $M_w$ (kDalton) | 735 | 470 | 596 |
| —$CH_2OH$ | 16 | 9 | 9 |
| —$CF_2H$ (a) | 24 | 43 | 45 |
| —$CF_2CH_3$ (b) | 23 | 47 | 42 |
| total (a) + (b) | 47 | 90 | 87 |

Data provided above well demonstrate that the use of limited amount of RAFT/MADIX chain transfer agent enables achieving high molecular weight latexes wherein the overall amount of chain ends associated to branches is substantially limited.

Table below provides an overview of the results obtained when dissolving cryogenically coagulated latexes obtained in the examples as above detailed in DMA; further, coagulated samples were also submitted to solubilisation in NMP at a weight content of 8% wt/wt: a qualitative assessment is provided below, whereas rating "good" is representative of a clear and homogenous solution, with no suspended/gelled fraction, which is perfectly adapted for preparing electrode-forming compositions by addition of electrode-active material(s) and/or conductivity enhancer(s); "bad" is representative of an non-homogenous solution, which may require additional separation steps for being suitable for use in formulating electrode-forming compositions.

TABLE 2

| Latex | $M_w$ KDalton | % Gel content 8% wt solution in NMP | Rating |
|---|---|---|---|
| A1 | 735 | <3 | Good |
| C1 | 470 | 55 | Bad |
| C2 | 596 | 35 | Fairly bad |

Data provided above clearly demonstrate that the latexes of the present invention provide for products which, thanks to their improved linearity and limited content of long chain branches, although endowed with higher molecular weight, possess improved solubilisation behaviour, and in particular provide solutions in organic solvents which are not detrimentally affected by the presence of insoluble residues, which are generally referred as "gels", and which are hence more adapted for use in formulating electrodes-forming compositions.

FIG. 1 is a graph depicting the relation between melt viscosity (MV) in KPoise and weight averaged molecular weight (Mw) in KDalton, measured as described above, for VDF polymers of the examples 1 and 2, which are depicted using the symbol □. The graph also depicts the lines corresponding to upper and lower boundaries of the inequalities $0.025 \times M_w$ (KDalton)+13≤MV (KPoise) ≤$0.050 \times M_w$ (KDalton)+10 and $0.030 \times M_w$ (KDalton)+12≤MV (KPoise)≤$0.045 \times M_w$ (KDalton)+9. This graph clearly shows how the inventive latexes of VDF-polymers (□) of the present invention are characterized by a peculiar $M_w$/MV relation, which clearly distinguishes the same (i) from reference emulsion-polymerized VDF-polymers (○), such as the latexes of Ex. 1C and Ex. 2C above, and of other emulsion polymerized latexes obtained in methods different from those hereby referred to; and (ii) from suspension-polymerized VDF polymers (o), which have been obtained in granular form (and not as latexes) by suspension polymerization under high VDF pressure, higher than critical VDF pressure, known to be 4.43 MPa (corresponding to 44.3 bar), hence in the presence of liquid VDF in the reaction medium, and which are known to possess a very linear structure.

The invention claimed is:

1. An aqueous dispersion [dispersion (D)] comprising particles of a vinylidene fluoride (VDF) polymer [polymer (A)] comprising recurring units derived from vinylidene fluoride (VDF) monomer, said polymer (A) comprising
   (i) more than 85.0% moles of recurring units derived from VDF, with respect to the total number of recurring units of polymer (A);
   (ii) sulphur-containing chain ends;
   (iii) a weight averaged molecular weight ($M_w$) of at least 500 KDalton, when measured by GPC, using N,N-dimethylacetamide (DMA) as solvent, against monodisperse polystyrene standards;
   wherein the relation between melt viscosity (MV) in KPoise determined at a shear rate of 100 sec$^{-1}$, and at a temperature of 230° C., according to ASTM D3835, and $M_w$, expressed in KDalton, satisfies the following inequality:

$0.025 \times M_w$ (KDalton)$+13 \leq MV$ (KPoise)$\leq 0.050 \times M_w$ (KDalton)$+10$.

2. The dispersion (D) of claim 1, wherein polymer (A) is selected from the group consisting of:
polymers consisting essentially of recurring units derived from VDF, and recurring units derived from at least one monomer (MA) the hydrophilic (meth)acrylic monomer (MA) complies formula:

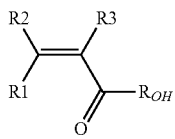

wherein each of R1, R2, equal or different from each other, is independently a hydrogen atom or a $C_1$-$C_3$ hydrocarbon group, and R3 is hydrogen and Ron is a hydroxyl group or a $C_1$-$C_5$ hydrocarbon moiety comprising at least one hydroxyl group; and
polymers consisting essentially of recurring units derived from VDF, from HFP and from monomer (MA).

3. The dispersion (D) of claim 2, wherein the monomer (MA) is selected from the group consisting of:
hydroxyethylacrylate (HEA) of formula:

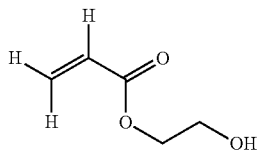

2-hydroxypropyl acrylate (HPA) of either of formulae:

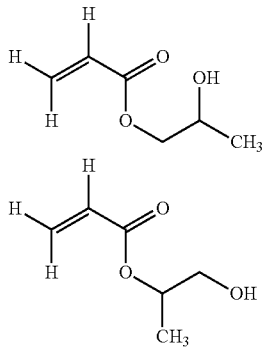

acrylic acid (AA) of formula:

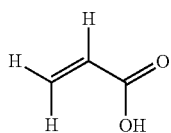

and mixtures thereof.

4. The dispersion (D) of claim 1, wherein polymer (A) comprises at least 0.1 moles of recurring units derived from said hydrophilic (meth)acrylic monomer (MA) and/or polymer (A) comprises at most 7.5% moles of recurring units derived from said hydrophilic (meth)acrylic monomer (MA).

5. A method of making a dispersion (D) according to claim 1, said method comprising emulsion polymerization of VDF in an aqueous medium in the presence of an inorganic initiator and in the presence of a RAFT/MADIX agent of any general formulae (I) and (II):

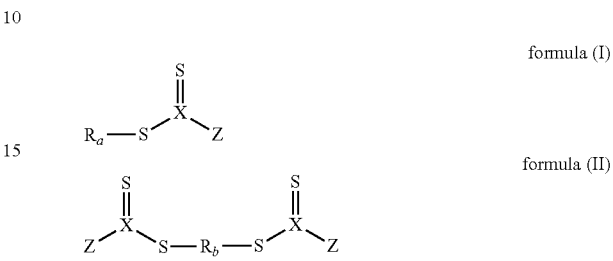

wherein X is carbon or phosphorous; $R_a$ is a monovalent organic group optionally substituted with one or more hydrophilic groups, $R_b$ is a divalent organic group optionally substituted with one or more hydrophilic groups, and Z is any group that promotes reactivity of the thiocarbonyl group towards radical addition, wherein the molar ratio between the said RAFT/MADIX agent and the said initiator is of less than 0.050 mol/mol.

6. The method of claim 5, wherein:
in formulae (I) and (II), Z is selected among —OH, —SH, optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy-phosphinyl [—P(=O) (OR$^4$)$_2$], dialkyl- or diaryl-phosphinyl [—P(=O)R$^4_2$], where R$^4$ is selected from the group consisting of optionally substituted $C_1$-$C_{18}$ alkyl, optionally substituted $C_2$-$C_{18}$ alkenyl, optionally substituted aryl, optionally substituted heterocyclyl, optionally substituted arylalkyl, optionally substituted alkaryl, optionally substituted acylamino, optionally substituted acylimino, optionally substituted amino, and a polymer chain selected from the group consisting of polyalkylene oxide polymers, and alkyl end capped derivatives thereof, wherein optional substituents for R$^4$ and Z groups include epoxy, hydroxy, alkoxy, acyl, acyloxy, carboxy (and its salts), sulfonic acid (and its salts), alkoxy- or aryloxy-carbonyl, isocyanato, cyano, silyl, halo, and dialkylamino; and/or
wherein in formulae (I) and (II), X is a carbon atom and RAFT/MADIX agent is selected from formulae (I') and (II'):

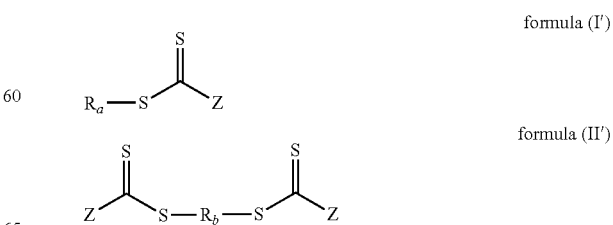

with $R_a$, $R_b$ and Z being as above detailed.

7. The method of claim 6, wherein said initiator is a persulfate radical initiator selected from the group consisting of sodium, potassium and ammonium persulfates, and wherein the amount of said initiator ranges from 0.001% to 20% by weight based on the weight of the aqueous medium.

8. The method of claim 6 wherein:
the amount of RAFT/MADIX agent is such to provide for a molar ratio between said RAFT/MADIX agent and said initiator of at most 0.048 mol/mol; and/or of at least 0.005 mol/mol; and
the said RAFT/MADIX agent is O-ethyl S-(1-methoxycarbonyl ethyl) dithiocarbonate.

9. A powder [powder (P)] comprising particles of a vinylidene fluoride (VDF) polymer [polymer (A)] comprising recurring units derived from vinylidene fluoride (VDF) monomer, said polymer (A) comprising:
(i) more than 85.0% moles of recurring units derived from VDF, with respect to the total number of recurring units of polymer (A);
(ii) sulphur-containing chain ends;
(iii) a weight averaged molecular weight (Mw) of at least 500 KDalton, when measured by GPC, using N,N-dimethylacetamide (DMA) as solvent, against monodisperse polystyrene standards;
wherein the relation between melt viscosity (MV) in KPoise determined at a shear rate of 100 sec$^{-1}$, and at a temperature of 230° C., according to ASTM D3835, and $M_w$, expressed in KDalton, satisfies the following inequality:

$$0.025 \times M_w(KDalton) + 13 \leq MV(KPoise) \leq 0.050 \times M_w(KDalton) + 10,$$

wherein said particles of polymer (A) possess a primary particle average size of less than 1 μm, preferably a primary particles average size of above 20 nm and below 350 nm.

10. A vinylidene fluoride (VDF) polymer [polymer (A)] comprising recurring units derived from vinylidene fluoride (VDF) monomer, said polymer (A) comprising:
(i) comprising more than 85.0% moles of recurring units derived from VDF, with respect to the total number of recurring units of polymer (A);
(ii) sulphur-containing chain ends;
(iii) a weight averaged molecular weight ($M_w$) of at least 500 KDalton, when measured by GPC, using N,N-dimethylacetamide (DMA) as solvent, against monodisperse polystyrene standards;
wherein the relation between melt viscosity (MV) in KPoise determined at a shear rate of 100 sec$^{-1}$, and at a temperature of 230° C., according to ASTM D3835, and $M_w$, expressed in KDalton, satisfies the following inequality:

$$0.025 \times M_w(KDalton) + 13 \leq MV(KPoise) \leq 0.050 \times M_w(KDalton) + 10.$$

11. A solvent-based electrode-forming composition comprising polymer (A) of claim 10, at least one polar organic solvent, a powdery electrode material and, optionally, an electro-conductivity-imparting additive and/or aviscosity modifying agent.

12. The solvent-based electrode-forming composition of claim 11, wherein the polar organic solvent is selected from the group consisting of N-methyl-2-pyrrolidone, dimethylformamide, N,N-dimethylacetamide, N,N-dimethylsulfoxide, hexamethylphosphonamide, dioxane, tetrahydrofuran, tetramethylurea, triethylphosphate, trimethylphosphate, and any combination of one or more thereof.

13. An aqueous electrode-forming composition comprising the dispersion (D) according to claim 1, a powdery electrode material, and, optionally an electroconductivity-imparting additive and/or a viscosity modifying agent.

14. An aqueous coating composition [composition (AC)] comprising dispersion (D) according to claim 1, at least one non-electroactive inorganic filler material and, optionally, one or more than one additional additive.

15. The composition (AC) of claim 14, wherein the non-electroactive inorganic filler material is selected from the group consisting of natural and synthetic silicas, zeolites, aluminas, titanias, metal carbonates, zirconias, silicon phosphates and silicates.

16. The composition (AC) according to claim 14, said composition (AC) being obtained by mixing:
(i) dispersion (D) in an amount of from 5 to 25% wt;
(ii) at least one non-electroactive inorganic filler material, in an amount of from 70 to 95% wt;
(iii) one or more than one additional additive, in an amount of 0 to 5% wt; and
optionally, adding water for adjusting solid contents in the range of 30 to 80% wt.

17. A method for the manufacture of a composite separator, said method comprising the following steps:
(i) providing a porous substrate;
(ii) providing the composition (AC) of claim 14;
(iii) applying said composition (AC) onto at least one surface of said porous substrate to provide a coating composition layer; and
(iv) drying said coating composition layer at a temperature of at least 60° C., to provide said composite separator.

18. A method for making a membrane comprising using the powder (P) of claim 9, said method comprising the steps of:
(i) preparing a solution [solution ($S^M$)] comprising:
polymer (A);
optionally, at least one pore forming agent [agent (P)]; and
a polar organic solvent;
(ii) processing said solution ($S^M$) into a film; and
(iii) immersing said film in a non-solvent bath.

19. A method for making a membrane comprising using the polymer (A) of claim 10, said method comprising the steps of:
(i) preparing a solution [solution ($S^M$)] comprising:
polymer (A);
optionally, at least one pore forming agent [agent (P)]; and
a polar organic solvent;
(ii) processing said solution ($S^M$) into a film; and
(iii) immersing said film in a non-solvent bath.

20. A membrane comprising the polymer (A) according to claim 10.

* * * * *